Patented July 23, 1935

2,009,028

UNITED STATES PATENT OFFICE 2,009,028

COMPOSITION FOR USE IN FORMING PLASTIC MATERIALS

Robert L. Sibley, Nitro, W. Va., assignor to The Rubber Service Laboratories Company, Akron, Ohio, a corporation of Ohio No Drawing. Application March 25, 1933, Serial No. 662,830

14 Claims. (Cl. 18—47)

This invention relates to compositions for use in connection with the molding or forming of rubber or other plastic materials, particularly during the vulcanization of rubber or during the molding or forming of other materials while the molds or forms are heated, the composition being used to form a coating or film on the mold or forming device to prevent the adhesion thereto of the material being formed.

The objects of this invention then are to provide an improved composition which prevents rubber and other materials from adhering to the mold, press plate or other forming device, to reduce the frequency of the cleaning of the mold or other forming device and to give the molded articles a more finished and attractive appearance.

It is well known that when rubber, phenol condensation products and similar materials are vulcanized or molded under heat there is a decided tendency of these materials to adhere to the molds and consequently soap has frequently been used on the surface of the mold adjacent to the rubber to prevent the rubber from adhering thereto. This use of soap, however, has been found to be unsatisfactory for the reason that this soap on decomposing by the heat employed during the vulcanization process, forms deposits on the mold, which necessitates frequent cleaning thereof. Hyposulfite of soda is another material, an aqueous solution of which, has been employed to prevent adhesion of rubber and like materials to the molds. Its use has not been found to be entirely satisfactory, as it leaves the surface of the rubber in a rough condition which interferes with the marketing of the finished product.

In accordance with the present invention it has been found that aromatic sulfonates, when applied to surfaces of molds and the like, prevent the adhesion thereto of rubber and other plastic materials.

The following materials are examples of the preferred class of compounds and their use preferably in an aqueous solution is included within the scope of the present invention: the sodium salt of benzene sulfonic acid; the potassium salt of naphthalene sulfonic acid; the sodium salt of isopropylated naphthalene sulfonic acid; the sodium salt of normal butylated naphthalene sulfonic acid; the sodium salt of toluene sulfonic acid; the sodium salt of amyl naphthalene sulfonic acid; the sodium salt of dibutyl naphthalene sulfonic acid; the sodium salt of the sulfuric acid derivatives of the reaction products of normal amyl alcohol with benzyl cresylic acid and dibenzyl cresylic acid respectively; the sodium salt of the sulfuric acid derivatives of the reaction products of ortho hydroxy diphenyl with normal butyl alcohol, isobutyl alcohol, amyl alcohol, octyl alcohol, cetyl alcohol, iso-amyl alcohol, and benzyl alcohol respectively; the potassium salt of the sulfuric acid derivatives of the reaction products of para hydroxy diphenyl with normal butyl alcohol, iso-butyl alcohol, normal amyl alcohol, iso-amyl alcohol, cetyl alcohol, octyl alcohol and cyclohexanol respectively; the sodium salt of the sulfuric acid derivatives of the reaction products of a mixture of substantially 85% ortho hydroxy diphenyl and substantially 15% para hydroxy diphenyl with normal butyl alcohol, iso-butyl alcohol, normal amyl alcohol, iso-amyl alcohol, normal propyl alcohol, iso-propyl alcohol, cetyl alcohol, octyl alcohol and cyclohexanol respectively. The above described salts of sulfuric acid derivatives of the reaction products of benzyl cresylic acid and hydroxy diphenyl with an alcohol may be conveniently prepared according to the process disclosed in my co-pending application Serial No. 639,149 filed October 22, 1932 and as hereinafter set forth. Other salts, preferably water soluble, than those hereinbefore set forth may be employed. It is desirable, however, to employ salts of the alkali metals.

The following examples are understood to be specific embodiments of the present invention and not limitations thereof.

Example I

One part by weight of the sodium salt of the sulfuric acid derivative of the reaction product of substantially two molecular proportions of normal butyl alcohol and substantially one molecular proportion of a mixture of substantially 85% ortho hydroxy diphenyl and substantially 15% para hydroxy diphenyl, prepared as disclosed in my prior application Serial No. 639,149, was dissolved in thirty parts of water. Thus as one method of preparation of the above compound substantially one molecular proportion of a mixture of substantially 85% of ortho hydroxy diphenyl and 15% of para hydroxy diphenyl and a slight excess over two molecular proportions of butyl alcohol were placed in a suitable reactor and heated at refluxing temperature for substantially two hours. After cooling to substantially 75° C., sulfonation was effected by adding preferably 93% sulfuric acid to the alcohol-hydroxy diphenyl product at a temperature of preferably 75° to 85° C., after which heating was continued for four hours at a temperature of substantially 80° to 85° C. The product so obtained was in the form of two layers, the upper layer of which was drawn off and diluted with water and treated with sufficient freshly slaked lime to convert the free sulfuric acid present to calcium sulfate and to convert the sulfuric acid derivative of the reaction product of normal butyl alcohol and hydroxy substituted diphenyl to the calcium salt thereof. After filtering off the calcium sulfate formed, sufficient sodium carbonate was added to the filtrate to form the corresponding sodium salt. The calcium carbonate thereby precipitated was filtered off and the filtrate thus obtained comprised an aqueous solution of the sodium salt of the sulfonated butylated ortho-para hydroxy diphenyl. Said solution as formed may be employed according to the present invention, or it may be concentrated or completely dried to the powder form. Preferably it is employed as a 50% aqueous solution. The solution thus obtained was flowed on the surface of the mold, which contacts with the rubber or other material, as for example by painting it thereon. The mold surface treated as described was found on testing to be resistant to the sticking or adhering of the molded surface, as for example vulcanized rubber, phenol condensation products and the like.

While the sodium salt of the sulfuric acid derivative of the reaction product of normal butyl alcohol and a mixture of substantially 85% ortho hydroxy diphenyl and substantially 15% para hydroxy diphenyl has been found to resist the sticking to the molds of vulcanized rubber, phenol condensation products and the like, it is preferred that it be employed in a solution in conjunction with other materials, thereby forming a still further desirable material. Such a composition is given under Example II.

*Example II*

A mixture was made up comprising

| | Grams |
|---|---|
| Sodium hyposulfite | 280 |
| Sugar | 70 |
| Magnesium sulfate crystals | 30 |
| Glycerine | 15 |
| Hexamethylene tetramine | 1.5 |
| Phenol | 2.0 |
| Sodium salt of the sulfuric acid derivative of the reaction product of normal butyl alcohol and a mixture of approximately 85% ortho hydroxy diphenyl and substantially 15% para hydroxy diphenyl | 5.0 |

The composition thus prepared was added to substantially 20 to 30 times its weight of water. The resulting product was flowed on the surface of the molds, press plates and the like, which contacts with the rubber or other material to be vulcanized or molded, by any convenient means, as for example by painting thereon. The film produced thereby was found to be markedly tough which resists rubbing off when the rubber or other material is pressed into the mold. Furthermore, the preferred composition was found on actual test to be very superior in preventing the vulcanized and molded materials from adhering to the mold.

By the term sugar as herein used is meant the various materials appearing in the glucose or saccharose groups, molasses and the like. Furthermore, other thiosulfates than the sodium salt thereof may be employed in the composition hereinbefore set forth. It is preferably, however, that salts of the alkali-metals be so employed. It is to be understood that it is not necessary that all the ingredients enumerated under Example II be employed in the new and improved mold coating composition or that they be employed in the ratios given.

What is claimed is:

1. A method of molding rubber and other plastic materials which includes the use of a mold coated with an alkali-metal salt of an alkylated aromatic sulfonic acid as a constituent thereof.

2. A method of molding rubber and other plastic materials which includes the use of a mold coated with an alkali metallic salt of an alkylated poly nuclei aromatic sulfonic acid as a constituent thereof.

3. A method of molding rubber and other plastic materials which includes the use of a mold coated with an alkali-metal salt of a sulfuric acid derivative of a reaction product of a hydroxy substituted diphenyl and an alcohol as a constituent thereof.

4. A method of molding rubber and other plastic materials which includes the use of a mold coated with an alkali-metal salt of a sulfuric acid derivative of a reaction product of a hydroxy substituted diphenyl and an aliphatic alcohol as a constituent thereof.

5. A method of molding rubber and other plastic materials which includes the use of a mold coated with an alkali-metal salt of a sulfuric acid derivative of a reaction product of an ortho hydroxy substituted diphenyl and an aliphatic alcohol as a constituent thereof.

6. A method of molding rubber and other plastic materials which includes the use of a mold coated with an alkali-metal salt of a sulfuric acid derivative of a reaction product of an aliphatic alcohol and a mixture of an ortho and para hydroxy substituted diphenyl as a constituent thereof.

7. A method of molding rubber and other plastic materials which includes the use of a mold coated with an alkali-metal salt of a sulfuric acid derivative of a reaction product of normal butyl alcohol and a mixture of substantially 85% ortho hydroxy diphenyl and substantially 15% para hydroxy diphenyl as a constituent thereof.

8. A method of molding rubber and other plastic materials which includes the use of a mold coated with the sodium salt of a sulfuric acid derivative of a product produced by reacting substantially two molecular proportions of normal butyl alcohol and substantially one molecular proportion of a mixture of substantially 85% ortho hydroxy diphenyl and substantially 15% para hydroxy diphenyl.

9. A composition for use on heated surfaces used for shaping rubber and other plastic materials comprising a hyposulfite of an alkali metal, a sugar, magnesium sulfate, glycerine, hexamethylenetetramine, a phenol and an alkylated aromatic sulfonic compound.

10. A composition for use on heated surfaces used for shaping rubber and other plastic materials comprising a hyposulfite of an alkali metal, a sugar, magnesium sulfate, glycerine, hexamethylenetetramine, a phenol and an alkali-metal salt of a sulfuric acid derivative of a reaction product of a hydroxy substituted diphenyl and an aliphatic alcohol.

11. A composition for use on heated surfaces used for shaping rubber and other plastic materials comprising a hyposulfite of an alkali metal, a sugar, magnesium sulfate, glycerine, hexamethylenetetramine, a phenol and an alkali-metal salt of a sulfuric acid derivative of a reaction product of an ortho hydroxy substituted diphenyl and normal butyl alcohol.

12. A composition for use on heated surfaces used for shaping rubber and other plastic materials comprising sodium hyposulfite, sugar, magnesium sulfate, glycerine, hexamethylenetetramine, phenol and the sodium salt of a sulfuric acid derivative of a reaction product of substantially two molecular proportions of normal butyl alcohol and substantially one molecular proportion of a mixture of substantially 85% ortho hydroxy diphenyl and substantially 15% para hydroxy diphenyl.

13. A method of molding rubber and other plastic materials which includes the use of a mold coated with an alkali-metal salt of a non-condensed poly nuclei aromatic sulfonic acid as a constituent thereof.

14. A method of molding rubber and other plastic materials which includes the use of a mold coated with an alkali metal salt of an alkylated diphenyl sulfonic acid as a constituent thereof.

ROBERT L. SIBLEY.